J. COULTER.
WIRE CHAIN MACHINE.
APPLICATION FILED OCT. 4, 1905. RENEWED SEPT. 8, 1911.

1,023,126.

Patented Apr. 16, 1912.
3 SHEETS—SHEET 1.

WITNESSES
H. A. Lamb.
G. J. Chaffee.

INVENTOR
James Coulter.
BY Geo. D. Phillips
his ATTORNEY

J. COULTER.
WIRE CHAIN MACHINE.
APPLICATION FILED OCT. 4, 1905. RENEWED SEPT. 8, 1911.

1,023,126.

Patented Apr. 16, 1912.

3 SHEETS—SHEET 2.

WITNESSES
H. A. Lamb.
S. J. Chaffee.

INVENTOR
James Coulter
BY Geo. D. Phillips
his ATTORNEY

J. COULTER.
WIRE CHAIN MACHINE.
APPLICATION FILED OCT. 4, 1905. RENEWED SEPT. 8, 1911.
1,023,126.
Patented Apr. 16, 1912.
3 SHEETS—SHEET 3.
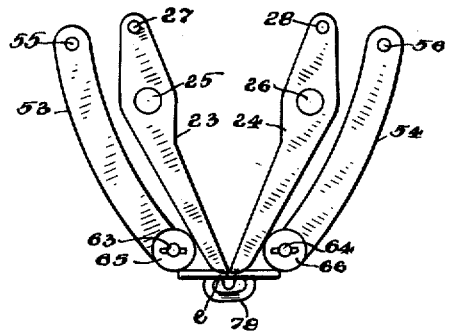
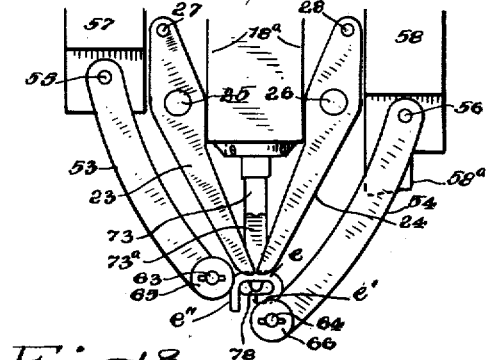
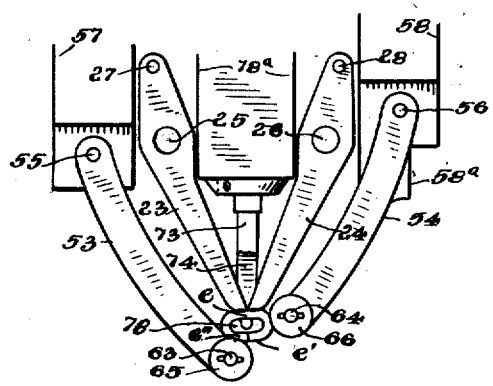
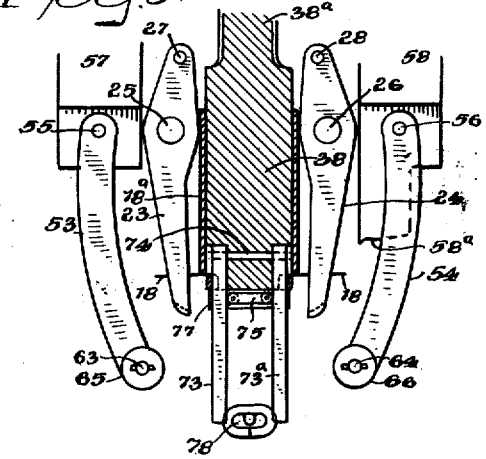
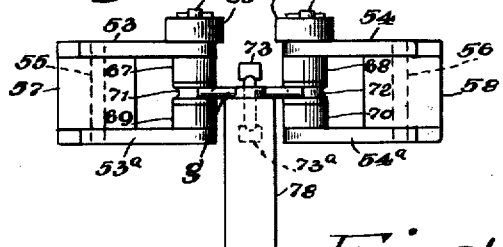
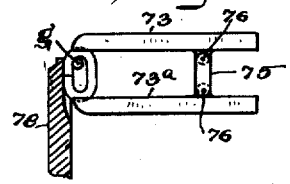
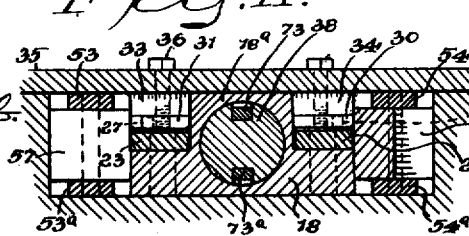
WITNESSES
H. A. Lamb
S. J. Chaffee
INVENTOR
James Coulter
BY Geo. O. Phillips.
his ATTORNEY

UNITED STATES PATENT OFFICE.

JAMES COULTER, OF BRIDGEPORT, CONNECTICUT, ASSIGNOR, BY MESNE ASSIGNMENTS, TO THE AUTOMATIC CHAIN COMPANY, OF BUFFALO, NEW YORK, A CORPORATION OF NEW YORK.

WIRE-CHAIN MACHINE.

1,023,126.     Specification of Letters Patent.     Patented Apr. 16, 1912.

Application filed October 4, 1905, Serial No. 281,271. Renewed September 8, 1911. Serial No. 648,394.

*To all whom it may concern:*

Be it known that I, JAMES COULTER, a citizen of the United States, residing at Bridgeport, Connecticut, have invented new and useful Improvements in Wire-Chain Machines, of which the following is a specification.

My invention relates to machines for making chain from wire or wire rods, and its object has been to provide such a machine having among others the following advantages; that of so forming chain links that the joint between the two ends of the wire or rod forming the link shall always be in substantially the same position relative to the link, to facilitate economy in welding the link, as more fully stated hereinafter.

A further advantage sought has been the production of a machine in which the meeting faces of the ends of the rod may be brought close together and substantially parallel to each other.

A further advantage sought has been to provide a machine in which the link, after being completed, is turned perpendicular to have threaded through it the rod which is to form the next following link, which machine shall have ample room for the chain to swing during said turning movement without liability of the chain catching upon any of the forming parts; and to such ends my invention consists in the chain forming machine hereinafter specified.

A further advantage sought has been to provide a machine in which a wire or rod blank shall be shaped into a link by the operation of forming rolls rolling it about a former until its ends meet, instead of its being formed by jaws which are forced against it.

Figure 1:
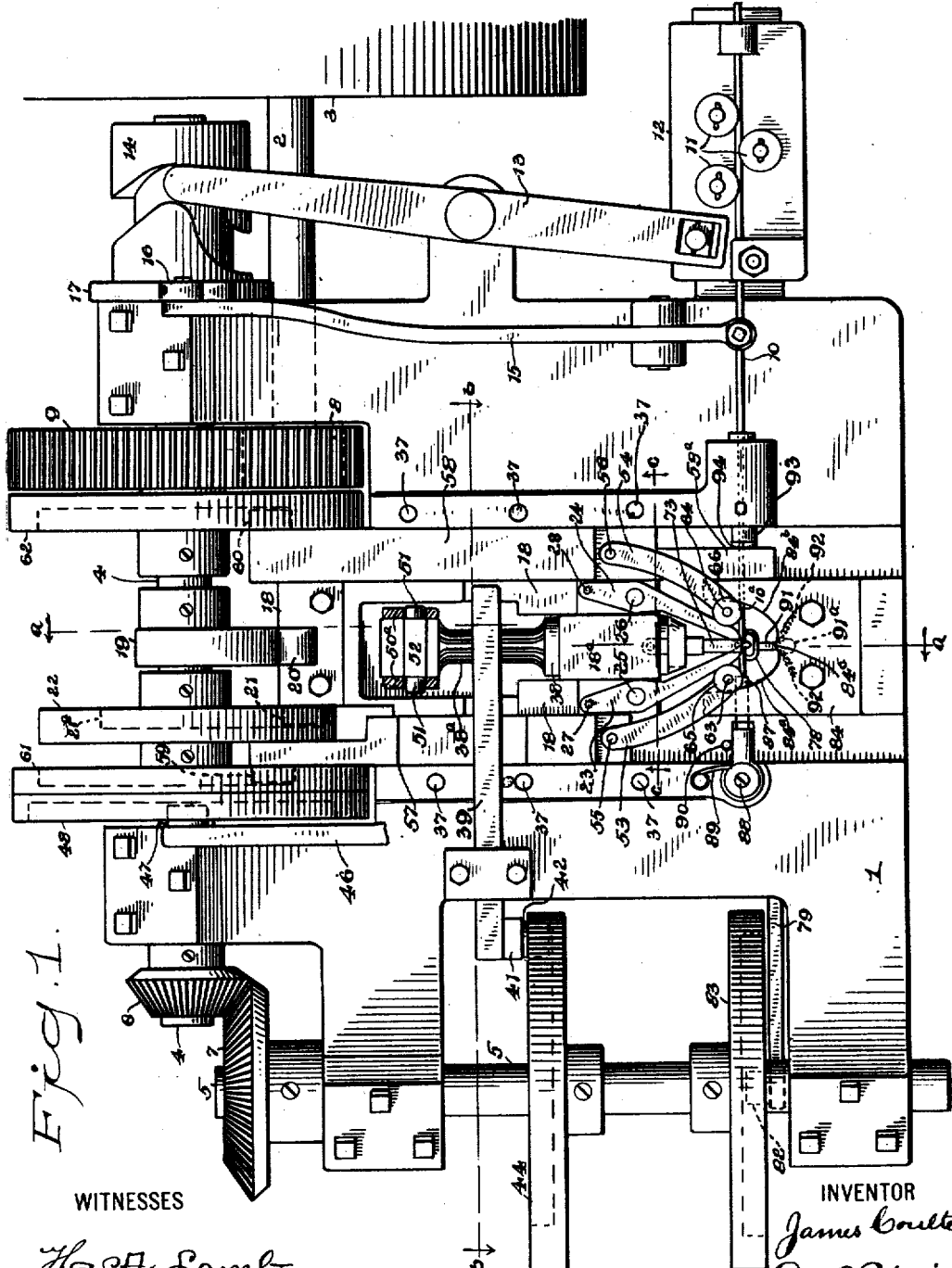
Figure 2:
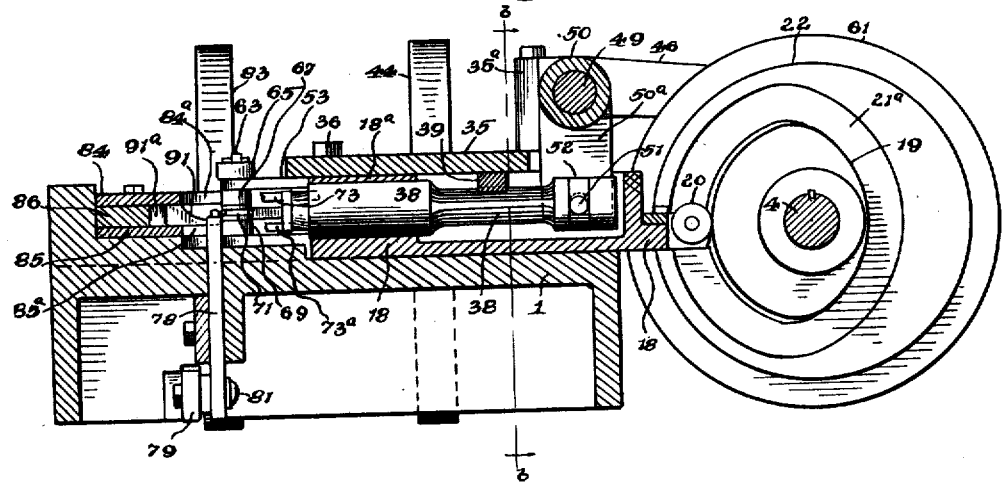
Figure 3:
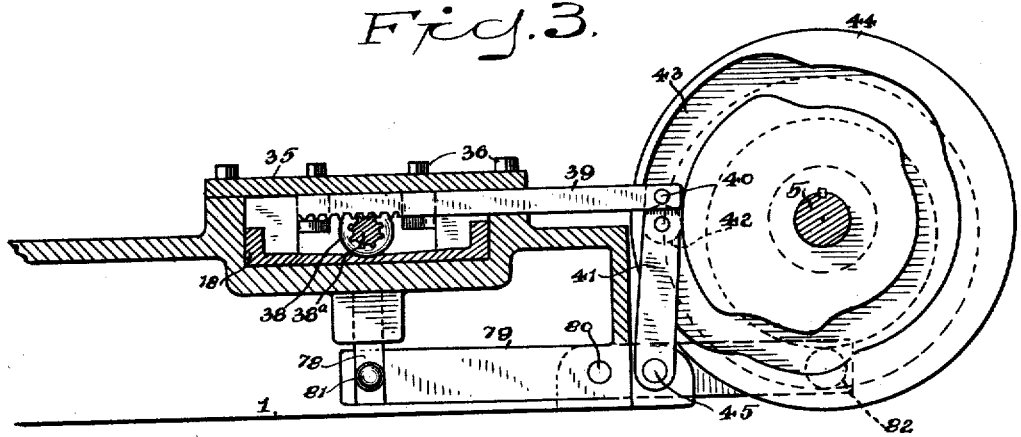
Figure 4:
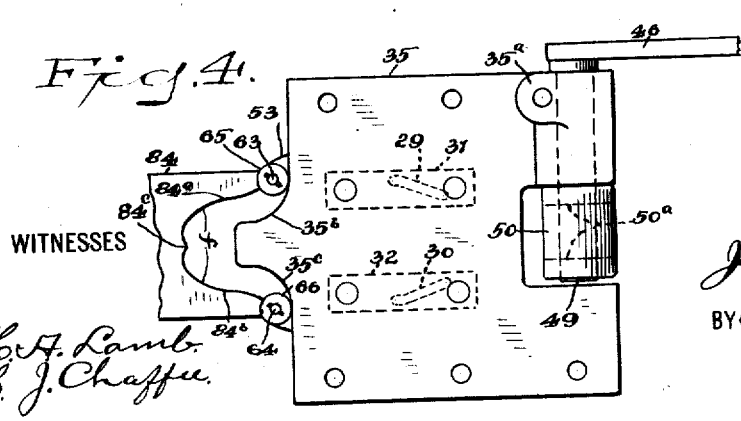

In the accompanying drawings Figure 1 is a top plan view of a machine constituting one embodiment of my invention; Fig. 2 is a vertical sectional view on the line *a—a* of Fig. 1; Fig. 3 is a sectional view on the line *b—b* of Figs. 1 and 2; Fig. 4 is a detail top plan view of the cover plate for the link-forming mechanism and showing the link-forming levers projecting therefrom, the cam plate for said levers being shown in broken view, and the operating lever of the link jaw holder being shown; Fig. 5 is an enlarged detail plan view of the link-forming levers, guiding and holding fingers, and link former, a link blank being shown in position for the commencement of the operation of forming a link; Fig. 6 is a view similar to Fig. 5, showing one end of a link completely bent into position, and the other end partly bent. Fig. 7 is a view similar to Fig. 6, showing the second end of the link bent into position; Fig. 8 is a view similar to Fig. 5, but showing the link-forming levers, and the guiding and holding fingers in retracted position, and also showing the newly formed link grasped by the jaws of the link holder ready to be rotated to a vertical position; Fig. 9 is an enlarged front elevation of the link forming levers, former, and the jaws of the link holder, a link blank being shown in said jaws; Fig. 10 is an enlarged detail side elevation of the link-holding jaws, holding a completed link in vertical position up against the former, the latter being shown in section, and showing the blank for the new link being threaded through the completed link; and Fig. 11 is an enlarged sectional view on the line *c—c* of Fig. 1.

My invention is capable of embodiment in many different forms. The form chosen to illustrate it, and which is the best form which I have conceived, consists of a bed 1 having bearings near the rear edge for a driving shaft 2, the latter carrying a driving pulley 3. A shaft 4 is journaled in bearings at the rear edge of the bed, and the driving shaft carries a pinion 8 meshing with a gear 9 on the shaft 4. A shaft 5 is also mounted in the said bed, along the left edge of the bed, and it is driven from the shaft 4 by a bevel pinion 6 on the shaft 4, which meshes with a bevel gear 7 on the shaft 5, the gear being twice the diameter of the pinion. The wire or wire rod 10 is fed into the cutting and forming mechanism by a feed comprising the usual slide 12 carrying straightening rolls 11, the slide being operated by a lever 13, which in turn is oscillated by a cam 14 on the shaft 4. A rod-clamping lever is fulcrumed on the bed, and is swung to clamping position by engagement of a roll 16 at its rear end with a cam 17 on the shaft 4.

The rod passes through a bushing 93 mounted in a socket formed on the bed, said bushing being preferably of hardened steel, and the edges of the hole through which the rod passes being sharpened so as to shear off the rod, as later described.

A former 78 is mounted in a vertical guide-way in the bed, and the upper end of the former is shaped to correspond with the inside of the link so that the link may be bent about it. The former is preferably, although not necessarily, so positioned that its rear surface is in line with the bushing 93. It is about this former that the parts move which shape the blank into the finished link. After the link is completed, I desire to turn it into a vertical position, so that the blank of the new link can be threaded through the link just formed, and as the parts which perform this turning movement must have a rotary movement, I do not want to add the further complication necessary to move such parts vertically to lift the link off the former. I therefore provide means to lower the former in the bed after the link has been taken hold of by said turning devices. The means for lowering the former may take many different forms. I find it convenient to pivot to the lower end of the former a lever 79 fulcrumed at 80 upon the bed, the opposite end of the lever having a roll that engages a path cam in the vertical face of a cam disk 48.

In order to sever from the rod or wire 10 the blank, or length which is to form the new link, I provide a bushing 58ª, which, coacting with the bushing 93, forms a shears, and I mount the bushing 58ª on a slide 58, movable forward and backward on the bed, said slide having a roll 60 that engages a path cam in the vertical face of a cam disk 62 on the shaft.

In forming the link, the blank is to be held against the rear surface of the former, and, as I desire to hold the blank so firmly that the devices which bend around the ends of the blank cannot drag the blank bodily to one side or the other of a central position on the former, I provide devices for holding the link with great firmness against the rear surface of the former. For this purpose, it is necessary that the former be strongly supported. To so support the former, I provide a brace or finger 91, the said brace having a rounded head 91ª adapted to turn in a semi-circular seat in the rear side of a filling piece 86, later to be described, the said brace being maintained in a central position and adapted to bear against the back of the former by springs 92. These springs, which are located on the underside of a cam plate 84, to be later described, permit the brace to be pushed out of the way by the parts which bend the link around the former.

The devices for holding the link against the former consist of fingers 23 and 24, which are pivotally mounted upon studs 25 and 26 respectively, the said studs being carried by a slide 18 which is mounted in guides extending forward and back of the bed. The forward ends of the fingers are provided with grooves which are adapted to form guides to guide the blank as it is pushed into position back of the former. The slide 18 is pushed toward the former by engagement of a cam 19 on the shaft 4 with a roll 20 on the said slide, and it is retracted by engagement of the roll 21 on the side of the slide with a path cam 21ª in a cam disk 22, the latter also being on the shaft 4. The rear ends of the fingers 23 and 24 are provided with pins 27 and 28 respectively, which operate in cam slots 29 and 30 (Figs. 4 and 11) in plates 31 and 32, which are fastened on the underside of the cover plate 35, which overlies the slide 18. The plates 31 and 32 are mounted upon filling pieces 33 and 34, which latter are directly supported by the plate 35: To bend the blank around the former, I use two forming rolls, one for each end of the blank. A convenient manner of mounting, guiding and operating the forming rolls is the following:

At each side of the slide 18 is a slide, one of them being the slide 58 before mentioned, and the other a slide 57, and to each of these slides is pivoted a pair of levers, the slide 58 carrying upper and lower levers 54 and 54ª, and the slide 57 upper and lower levers 53 and 53ª. The free ends of the levers 54 and 54ª carry a pin 64 which has journaled thereon, above the lever 54 an anti-friction roll 66, and between the levers, plain rolls 68 and 70, and an intermediate grooved forming roll 72. Similarly the levers 53 and 53ª have a pin 63 carrying at its upper end an anti-friction roll 65, and between the levers plain rolls 67 and 69, and a grooved forming roll 71. The cover plate 35 has cams 35ᶜ and 35ᵇ formed on its forward edge, which cams are adapted to be engaged by the rolls 66 and 65 respectively, for the purpose of moving the levers 54 and 53 laterally away from the former as they are retracted. On the bed in front of the former are upper and lower guides 84 and 85 separated by a filling plate 86 before referred to, and these guides have formed on their rear surfaces cams 84ᵇ and 84ª, and also preferably a teat or projection 84ᶜ between the said cams. The said cams are adapted to be engaged by the plain rolls on the pins 64 and 63, which rolls are between the levers. Thus the grooved rolls are given the proper motions to bend the ends of the link blank around the former, as will be later described. The slide 57 carries a roll corresponding to the roll 60 of the slide 58, the roll of the slide 57 engaging a path cam in the inner vertical faces of a cam disk 61.

I provide means to take hold of the completed link in its horizontal position and while it is still on the former, and turn it into a vertical position ready to have the next blank threaded through it. Obviously, such means can take many different forms. The means which I prefer to use consist of a link holder 38 having a cylindrical portion that is mounted to rotate and slide in a bearing 18ª formed on the slide 18 (Figs. 2 and 11). Link holding jaws 73 and 73ª are pivoted at their rear ends on a pin 74 (Fig. 8) and are connected by a link 75 (Figs. 8 and 10), which is pivoted to said jaws by pins 76. The pin holes are slightly elongated to permit a slight opening and closing movement of the free ends of the jaws so that they may spring apart to grasp a completed link, and to enable the jaws to hold said link, grooved seats are preferably formed in the ends of said jaws (Figs. 9 and 10). The link holder 38 may be moved forward and back by any convenient means. That which I prefer consists of the following parts: A rock shaft 49 is mounted in bearings on the rear end of the slide 18 transversely to its line of movement, and such shaft is oscillated by an arm 46 secured thereto, and carrying at its rear end an anti-friction roll 47 that engages a path cam 48 in a cam body fastened on the shaft 4. The shaft 49 has depending arms 50ª that are provided with slots to engage pins 51 on a collar 52 journaled on the link holder 38. Thus when the lever 46 is oscillated, through the action of the cam, the arms 50ª are moved forward and back, and by engagement with the pins on the collar carry with them the link holder.

In order to rotate the link holder, it may be provided with a toothed portion 38ª, which is adapted to be engaged by a rack 39 mounted in a guide-way formed between the bed and the cover plate, the toothed portion being long enough to permit the longitudinal movements of the link holder without causing the said toothed portion to pass from beneath the rack. The rack may be reciprocated in any convenient manner. I have shown it pivoted by a pin 40 to the upper end of a lever 41, which latter is fulcrumed on a pin 45 fixed on the bed. The lever carries an anti-friction roll 42, which engages a path cam 43 in a disk 44 fastened on the shaft 5. As the gear 7 is twice the diameter of the pinion 6, the shaft 5 turns only half a revolution for a full turn of the shaft 4. The path cam 43, as shown in Fig. 3, is so shaped as at each half turn thereof to cause the link holder to turn the link, and such turning movements alternately occur in opposite directions, as will later more fully be described.

In order to stop the feeding movement so that the blank shall be centrally positioned with reference to the former, I provide a stop in the form of a pin 87, carried by a holder which is pivoted on a pin 88 fixed on the frame, a spring 89 being provided which tends to throw the stop against a stationary pin 90. Thus, the stop normally rests against the pin 90 and in line with the path of movement of the incoming blank, and yet the spring 89 permits the roll 71 to push the stop out of the way when the link is being formed.

In the operation of the above-described embodiment of my invention, the slide 12 feeds sufficient wire to form a blank from which to make a link. The distance from the cutting face of the bushing 94 to the center of the former is one and one-half times the length of a blank. Therefore, when the slide 58 makes the first cutting movement, the first blank will remain in the bushing 94, while all the mechanism runs idle as though a link were being formed. The second feeding movement will force the first blank out of the bushing 94 and back of the former, and during this operation the fingers will be so positioned by the various cams that the grooves in their forward faces will, together with the rear surface of the former, form a guide for the incoming blank. The grooved rolls 71 and 72 are also positioned in line to form a guide for the said blank. The incoming blank strikes against the end of the stop 87, and as the next blank is pushed up by the wire 10, its forward end 10ª will bear against the end of the blank being positioned, so that the blank is held on both ends and accurately positioned, with its center opposite the center of the former.

As I desire to have the gap between the ends of the blank always in exactly the same position relative to the body of the link, I wish to prevent the blank from being dragged either way from its central position as its ends are being bent over. To do this, I first cause the link to be jammed hard against the former. This is accomplished by moving the fingers 23 and 24 close together, the link-holding jaws being retracted, and forcing them toward the former to clamp the link. The brace 91 enables the former to withstand this pressure. Second, I cause the grooved rolls 71 and 72 to move forward simultaneously, thus bending both ends of the link at the same time about the former. Buckling of the blank is prevented by the pressure of the fingers 23 and 24. The rolls 72 and 71 are guided in their movements by engagement of the plain rolls above and beneath them with the cams 84ᵇ and 84ª. Their movements continue until they reach approximately the points f (Fig. 4), and this brings the blank to an approximately U shape.

As the rolls 72 and 71 cannot both act upon their respective extremities of the blank at the same time, I cause one of them to pause while the other completes its bending movement. As the illustrated machine is designed, it is the roll 71 which will pause, while the roll 72 will continue on and turn the end $e'$ (Fig. 6) around the former. When the plain rolls above and below the roll 72 reach the teat $84^c$, they force the roll 72 hard against the end of the blank, and not only bend such end to a position in a straight line with the position to be occupied by the end $e''$, but they force the skin on the outer surface of the blank along with the roll 72, so that, instead of a V-shaped gap between the ends of the blank, the end surfaces will be parallel to each other, and a minimum gap will be formed. The slide 58 then retracts sufficiently to permit the slide 57 to advance the roll 71 and bend the other end $e''$ of the blank in a similar manner, as shown in Fig. 7. Both of the rolls 71 and 72 are permitted to push the brace 91 out of the way because of the springs 92. The link is now complete. The link holder 38 is now advanced causing the link-holding fingers 73 and $73^a$ (which are now in horizontal position) to be sprung over the ends of the link, as in Fig. 8, the fingers 23 and 24 and the link-forming rolls being retracted as shown in the said figure. The former is retracted or depressed and the link holder 38 is now rotated to bring the link into vertical position, after which the link holder is advanced to insert the link in the groove in the rear face of the former, as illustrated in Fig. 10, the latter having again been elevated. The link now is in position so that, when the new blank is fed into place, it will pass through the link just formed.

If the link-holding fingers 73 and $73^a$ always turned in the same direction to raise the link from horizontal to vertical position, the chain would be twisted a quarter of a turn each time a link was made and would be badly snarled. In fact, to overcome this, machines have heretofore been provided with rotating tables on which the pile of chain could fall, the table being rotated to unwind in opposition to the winding movement just described. To prevent such twisting and obviate the necessity for such a table is an important object and one which is accomplished by my said machine.

It will be seen by an inspection of Fig. 3 that the cam 43 which controls the rotating movements of the link holder 38 is so shaped that it first moves the rack 39 in one direction and then holds it there for about a quarter of a revolution, and then moves it in an opposite direction and holds it in the latter position for about the same period. In other words, I first cause the link-holding jaws to turn in one direction or clockwise, in turning the link from horizontal to vertical position, and then cause them to turn in the opposite, or counter clockwise, direction for the next succeeding link so that the alternate twists of the chain are in opposite directions and neutralize each other. The result is that the chain is not twisted at all.

After the fingers 23 and 24 have gotten a firm hold on the new blank, the link-holding fingers 73 and $73^a$ are retracted and returned to horizontal position. The described cycle of operations is then repeated.

It will be observed that the above-described embodiment of my invention has among others the following advantages: The joint between the ends of the link always occurs in precisely the same position, and thus the electrodes of a welding machine can be placed close together and the section of link which is heated (which is that between the electrodes) reduced to the minimum amount. This would not be possible if the joint varied in position, because then the electrodes would have to be as far apart as the widest range of variation. This feature of my invention permits a considerable saving in electrical energy necessary to heat the links.

The links are so formed that although there would naturally be a V-shaped gap between the ends of the blank, my machine causes the metal to be dragged toward the gap on the outer surfaces of the ends of the links and thus to fill up the gap that would otherwise occur. This makes the welding a simpler and quicker matter.

In my machine the link is firmly held against the former by the holding fingers 23 and 24, and the main portions of the bending movements of the ends of the blank take place simultaneously, so that there is no tendency to drag the blank one way or the other. If the roll 71, for instance, moved first and the roll 72 remained stationary while the roll 71 was bending its end of the link, the latter roll would tend to drag its end of the blank around the former and thus to throw the ends of the joint between the link out of place.

My devices for bending the ends of the link all retreat back of the former, after the link has been completed, and leave no parts or projections beside the former for the chain to catch upon as the completed link is turned to vertical position. This turning movement has a tendency to whip the chain first one way and then the other, and as the machine makes as high as forty (40) links per minute, it would cause the chain to catch upon the link-forming parts if they were in the plane of such movements of the chain. By causing the link-forming parts to retreat out of the way in the manner described, the certainty and possible speed of the machine are increased.

As my machine forms the link by the rolling action of the forming rolls as distinguished from the sharp forming action of jaws, the metal of the wire blank is gradually rolled into the form of the link. This treatment of the blank imposes much less strain upon the skin of its outer periphery than would be the case with forming jaws, and the link is formed without injury to such skin, so that a stronger link results.

The above machine by permitting first one forming roll and then another to complete its work, enables a shorter link to be made than could be made otherwise, and thus a chain of greater flexibility can be produced than if the links were longer.

Having thus described my invention what I claim as new and desire to secure by Letters Patent is:

1. In a machine for forming chain, the combination of a vertically movable and laterally stationary former, means for positioning and holding a blank so that the center of the blank shall be opposite the center of the former, and means comprising independently operating link forming levers for bending the ends of the blank about the former and into welding contact while the latter remains in fixed position, said independently operating link forming levers acting to bend both ends of the blank equal amounts about corresponding portions of the stationary former in the same time, whereby tendency to displace the relative positions of the center of the blank and center of the former is prevented.

2. In a machine for forming chain, the combination of a former, means for feeding a blank and positioning it so that the center of the blank shall be opposite the center of the former, and devices acting simultaneously to turn each end of the blank partly around the former, said devices thereafter acting successively on the opposite end portions of the blank to roll the ends of the blank toward each other into alined relation.

3. In a machine for forming chain, the combination of a former, means for placing and maintaining a blank symmetrical with reference to said former, and means movable about the former and acting to simultaneously roll the ends of the blank symmetrically with reference to and about said former and then to cease bending action on one end of the blank while the other end is being further bent and thereafter to complete the bend of the other end to bring the ends of the blank together.

4. In a machine for forming chain, the combination of a substantially oval former, means for placing the center of a wire blank on the minor axis of the oval of said former, and plural means relatively movable about the former and acting simultaneously along the end portions of the blank for bending the ends of said blank partially around said former in substantially the same time, said means being maintained symmetrical to each other relative to said axis, and thereafter acting successively to completely bend the ends of the blank about the former.

5. In a machine for forming chain, the combination of a former, means for feeding a blank so that the center of said blank is opposite the center of said former, means for clamping said blank at its central portion against said former, means acting independently upon the ends of the blank for bending the said blank about said former, said bending means acting simultaneously on both ends of the blank for part of the bending action and then acting successively on the ends of the blank to bring them into intimate contact for welding.

6. In a machine for forming chain, the combination of a former, means for placing a blank against said former, means for bending the blank completely about the former to bring the ends of the blank into substantial contact, said means comprising bending rolls and mechanism for causing first one of said rolls to move to the joint between the ends of the blank and then the other roll to move to said joint.

7. In a machine for forming chain, the combination of a former, means for placing a blank against said former, means for bending said blank around said former, said means comprising bending rolls, guiding rolls carried by said bending rolls, a cam shaped to cause said guiding rolls to travel around said former, and means for moving said rolls simultaneously during the main part of the bending movement, and then for causing first one of said sets of rolls and then the other to move to the joint between the ends of the blank.

8. In a machine for forming chain, the combination of a former, means for placing a blank against said former, means to hold said blank against said former, two forming rolls independent of said means, pins upon which said rolls are mounted, guiding rolls on said pins and on opposite sides of said forming rolls, cams for each of said guiding rolls, said cams being shaped to give said forming rolls paths to bend the blank completely about said former, parts in which said pins are mounted, and means for moving said parts to cause said rolls to travel along their cams and successively bring the ends of the blank to the joint of the link.

9. In a machine for forming chain, the combination of a former, means for placing a blank against said former, means to hold said blank against said former, two forming rolls, pins upon which said rolls are mounted, guiding rolls on said pins and on opposite sides of said forming rolls, cams for each of said guiding rolls, said cams being shaped to give said forming rolls paths to bend the blank completely about said former, parts in which said pins are mounted, said parts consisting of links, slides to which said links are pivoted, and means for moving said slides simultaneously and then successively to cause the forming rolls to successively arrive at the joint of the link.

10. In a machine for forming chain, the combination of a former, means for placing a blank against said former, means to hold said blank against said former, two forming rolls, pins upon which said rolls are mounted, guiding rolls on said pins on opposite sides of said forming rolls, a cam for each of said guiding rolls, said cams being shaped to give said forming rolls paths about the former, a projection for forcing the rolls toward the former at a point near the joint in the link, and means for moving said parts to cause said rolls to travel along their cams.

11. In a machine for forming chain, the combination of a former, means for placing a blank against said former, means to hold said blank against said former, two forming rolls, pins upon which said rolls are mounted, guiding rolls on said pins on opposite sides of said forming rolls, a cam for each of said guiding rolls, said cams being shaped to give said forming rolls paths to bend the blank completely about the former, a projection for forcing the rolls toward the former at a point near the joint in the link, and means for moving said parts to cause said rolls to travel along their cams, said means causing first one set of rolls and then the other set to approach the joint in the link.

12. In a machine for forming chain, the combination of a former, means for placing a blank against said former, means to hold said blank against said former, two forming rolls, pins upon which said rolls are mounted, guiding rolls on said pins on opposite sides of said forming rolls, a cam for each of said guiding rolls, said cams being shaped to give said forming rolls paths to bend the blank completely about the former, a projection at the juncture of said cams for forcing the rolls toward the former at points near the joint in the link, means for moving said parts to cause said rolls to travel along their cams, said means causing first one set of rolls and then the other set to approach the joint in the link, additional guide rolls on said pins, and cams adapted to be engaged by said additional guide rolls on the retracting movement of said parts to carry said forming rolls away from said former.

13. In a machine for forming chain, the combination of a former, means for placing a blank against said former, means acting independently to hold said blank against said former, two slides mounted in the machine, upper and lower links pivoted to each of said slides, pins pivoted in the ends of said pairs of links, upper and lower guide rolls on said pins between said links, forming rolls between said guiding rolls, and upper and lower cams which are adapted to engage said guiding rolls to cause the forming rolls to successively approach the link joint to bend the blank completely about the former.

14. In a machine for forming chain, the combination of a former, means for placing a blank against said former, means to hold said blank against said former, two slides mounted in the machine, upper and lower links pivoted to each of said slides, pins pivoted in the ends of said pairs of links, upper and lower guide rolls on said pins between said links, forming rolls between said guiding rolls, upper and lower cams which are adapted to engage said guiding rolls, guiding rolls mounted on said pins above said upper links, and cams adapted to be engaged by said last mentioned guiding rolls to retract the forming rolls from the former.

15. In a machine for forming chain, the combination of a former, means for placing a blank against said former, a slide, fingers pivoted to said slide, and adapted to force the blank against the former, means other than said holding fingers for bending the ends of the blank around the former, and mechanism for causing said means to simultaneously bend both ends of the blank partly about said former and then complete the bending action first of one and then the other.

16. In a machine for forming chain, the combination of a former, fingers adapted to force a blank against the former, link-forming rolls, movable parts upon which said fingers and rolls are mounted, means for moving said parts, said means being so formed as to position said fingers, and forming rolls to form a guide to guide the blank in assuming a position back of said former, means for feeding the blank along the guide thus formed, said finger-operating means then causing the said fingers to force the blank against the former, and said forming roll-operating means then causing said forming rolls to sweep the ends of the blank around the former.

17. In a machine for forming chain, the combination of a former, means for positioning a blank at one side of said former, link-holding fingers, means for forcing said fingers to hold the blank against the former, means for bending the ends of the blank, and a pivoted brace adapted to bear against the side of said former opposite to said fingers, whereby said brace may be swept out of the way by the means for bending the blank.

18. In a machine for forming chain, the combination of a former, means for feeding a blank to a position beside the former, means for forcing the middle of the blank against the former, a pivoted brace adapted to bear upon the opposite side of the former, yielding means tending to hold said brace in position against the former, link-forming rolls and means for causing them to bend the ends of the blank around the former, whereby said brace may yield to permit movement of said rolls.

19. In a machine for forming chain, the combination of a former, means for feeding a blank to a position beside the former, means for forcing the middle of the blank against the former, a pivoted brace adapted to bear upon the opposite side of the former, yielding means tending to hold said brace in position against the former, link-forming rolls and means for causing them to bend the ends of the blank around the former, whereby said brace may yield to permit movement of said rolls, and means for moving first one of said rolls and then the other of said rolls to a position between said brace and said former.

20. In a machine for forming chain, the combination of a former, means for simultaneously bending the ends of a wire blank around said former, said means acting successively on the ends of the blank for forcing the skin of the outer surface of the ends of said blank successively toward the joint between said ends.

21. In a machine for forming chain, the combination of a former, means to positively grip the blank against the former, actuating devices therefor, and means independent of said first named means for bending the ends of the blank simultaneously part way about the former and then bend the ends in succession completely around the former, whereby said first mentioned means prevents the blank from being dragged in either direction from its original position during such simultaneous and successive bending.

22. In a machine for forming chain, the combination of a former, means for feeding a blank longitudinally to a position adjacent to said former, means for bending the blank about the former, means for engaging the completed link and turning it across the path of movement of the incoming blank, and means for operating said link turning means first in one and then in the other direction to turn successive links alternately in opposite directions.

23. In a machine for forming chain, the combination of a former, means for feeding a blank longitudinally to a position beside said former, means for bending the ends of the blank about the former, means for engaging the link thus formed, means for moving the former from the engaged link and means for turning it to a position substantially perpendicular to the position in which it was formed, and means for operating said turning means, first in one direction and then in the other.

24. In a machine for forming chain, the combination of a former, means for feeding a wire blank longitudinally to a position beside said former, means for bending said blank around said former, link turning means adapted to engage and hold said link, means for withdrawing said former from within the link, means for turning said link turning means first in one and then in the opposite direction to bring the successive links to a position in line with the former, said former operating means then restoring the former to its original position, whereby a new blank may be threaded through the completed link and be formed about the former as was the previous blank.

25. In a machine for forming chain, the combination of a former, means for feeding a wire blank longitudinally to a position beside said former, means for bending said blank around said former, link turning means adapted to engage and hold the link, means for withdrawing said former from within the link, means for turning said link turning means to bring the link to a position in line with the former, said former having a groove adapted to receive the link when in the last mentioned position, said former operating means then restoring the former to its original position, whereby a new blank may be threaded through the completed link and be formed about the former as was the previous blank, said link turning means being turned first in one direction and then in the opposite direction, whereby twisting of the chain is avoided, said link turning means comprising a cylindrical body slidably and rotatably mounted, and fingers yieldably connected to said body, said fingers having grooves adapted to fit the link.

26. In a machine for forming chain links, the combination of a former about which the link is formed, and means for bending the blank completely about the former, said means comprising link forming devices arranged and adapted to act at the same time to partially bend the blank about the former and to then act successively on the ends of the blank to complete the bending action.

27. In a chain forming machine, the combination of a former, means for supporting it in fixed position as the blank is bent around it, means for feeding a blank to a position beside said former, link forming levers for bending said blank about said former, means for turning said blank to a position perpendicular to that in which it was formed, and means for retracting the link forming levers out of the plane of the turning movement of said link at the time of said turning movement, whereby catching of the chain upon said link forming levers is prevented.

28. In a chain forming machine, the combination of a former, means for feeding a blank to a position beside said former, means for bending said blank about said former, and means for turning said blank to a position perpendicular to that in which it was formed, said bending means being so constructed as to be retracted out of the plane of the turning movement of said link at the time of said turning movement, whereby catching of the chain upon said bending means is prevented, and means for turning said turning means to cause successive links to be turned alternately in opposite directions.

29. In a machine for forming chain, the combination of a former, means for feeding a blank to a position beside the former, means adapted to force the blank against the former, a pair of forming rolls, and means for causing said rolls to act simultaneously to bend the blank partly about the former and then to successively roll along the end portions of the blank to the joint of the link to complete the link formation and bring the ends of the link into alined relation.

30. In a machine for forming chain, the combination of a former, means for moving the former longitudinally of itself, means for feeding a blank beside the former, a slide movable perpendicular to said former, blank holding fingers pivoted on said slide, stationary cams and pins on said fingers engaging said cams, said fingers being adapted to force a blank against said former, a cylindrical body slidably and rotatably mounted, means for sliding and rotating said body, link engaging fingers carried by said body, slides mounted on opposite sides of said first mentioned slide, links pivoted to said slides, link forming rolls, and guiding rolls pivoted to said links, cams adapted to cause said links to bend the blank about the former, means for operating said last mentioned slides so as to cause said forming rolls to simultaneously bend the ends of the blanks and then to cause first one and then the other of them to pinch its respective end of the blank against the former.

31. In a machine for forming chain, the combination of a former, means for feeding a blank to a position beside said former, a stop normally standing in line with the blank, means for holding said stop in said position, a pivoted brace adapted to support the side of the former opposite to said blank, means for yieldingly holding said pivoted brace against the former, means for forcing the blank against the former, and means for bending the ends of the blank around the former, said means acting to move the brace.

32. In a machine for forming chain, the combination of a former, means for feeding a blank to a position beside said former, a stop normally standing in line with the blank, means for holding said stop in said position, a pivoted brace adapted to support the side of the former opposite to said blank, means for yieldingly holding said pivoted brace against the former, means for forcing the blank against the former, and means for bending the ends of the blank around the former and for moving the brace, said means for bending the blank comprising forming rolls, guiding rolls, parts upon which said rolls are mounted, and cams adapted to guide said guiding rolls.

33. In a machine for forming chain, the combination of a longitudinally movable former, means for feeding a blank to a position beside the former, means to brace the former both front and back, and means to bend the blank around the stationary former, said means for bracing the former being adapted to engage and disengage the former.

34. In a chain forming machine, the combination of a former, means for feeding a blank to a position beside said former, a yielding stop in the path of the bending means and against which the end of said blank is adapted to strike to position the blank with relation to the former, means for forcing the blank against the former when stopped in bending position, and means for bending the blank about the former.

35. In a machine for forming chain, the combination of a former, means for placing a blank beside the former, and means for bending the blank completely around the former comprising rolls means for directing said rolls in their proper paths about the former, and means to cause the rolls to bend the ends of the blank successively to the position of the link joint and in welding contact.

36. In a machine for forming chain, the combination of a former, means for holding a blank against the former, forming rolls and means for causing the rolls to simultaneously travel part way about the former and to then successively travel to roll the ends of the blank together around the former.

37. In a machine of the character described, independently reciprocating supports, link forming levers pivoted thereon, means for simultaneously effecting a forward movement of said supports to U up a blank and means for effecting an alternately independent movement of said supports to give a final bend, guide rolls and forming rolls on said levers, guides for said levers, and a former, for the purpose set forth.

38. In a machine of the character described, independently reciprocating supports, link forming levers operatively mounted thereon, means for simultaneously effecting a forward movement of said supports to U up a blank, means for effecting an alternately independent movement of said supports to give a final bend, guide rolls on said levers, guides engaged by said rolls, forming rolls on said levers, a vertically operating former or anvil, and means for operating said anvil for the purpose set forth.

39. In a machine of the character described, independently reciprocating supports, link forming levers operatively mounted thereon, guide rolls and forming rolls on said levers, guides engaged by said guide rolls, a former or anvil about which the link is bent, means for operating said link forming lever supports so that both levers will be moved together to U up the blank, of which the link is formed, means for temporarily halting one lever, means for advancing the other lever to complete one side of the link, and means on said guides to force the guide roll toward the former or anvil to give a final bend, means for retreating the last named link forming lever and advancing the other link forming lever to complete the opposite side of the link, for the purpose set forth.

40. In a machine of the character described, link forming levers, independently reciprocating supports on which said levers are operatively mounted, a guide or track for said levers, a vertically movable former, wire feeding mechanism, a support for the wire, a cut off bushing die mounted on one of the link forming lever supports so that the forward movement of said support will cut off a blank while a previous blank is being formed into a link, a movable stop for the end of the blank adapted to be actuated by one of said link forming lever supports, combined guide and pinch fingers, a reciprocating support therefor adapted to bring said fingers in the feeding line of the wire to serve as a guide therefor, and when the wire is against the movable stop to exert a further pressure against the wire, jaws adapted to grasp a completed link, a rotatable and longitudinally operating holder for said jaws, for the purpose set forth.

41. In a machine of the character described, link forming levers, guide and forming rolls thereon, said forming rolls having grooved faces adapted to serve as wire guides, independently reciprocating supports on which said levers are operatively mounted, a track for guiding the link forming levers during the link bending operation, a vertically operating former or anvil, wire feeding mechanism, a spring actuated swinging stop for the wire to be actuated by one of the forming levers to move said stop out of the way during the formation of a link, means for severing a link carried by one of the link forming lever supports, combined guide and pinch fingers, means for operating the same, link holding jaws, and a rotatable and longitudinally operating holder for said jaws, for the purpose set forth.

42. In a machine of the character described, link forming levers, independently reciprocating supports on which said levers are operatively mounted, wire feeding mechanism, means carried by one of the link forming lever supports for severing a section from the wire while a link is being formed from a previously severed section, and means for maintaining the second severed section in the feeding line of the wire after the completion of a link from the previous severed section, for the purpose set forth.

43. In combination, reciprocating link forming levers, means for advancing both levers together to U up a blank, a former about which the blank is bent, means for halting one of said levers while the other is advanced to give the final bend to one side of a link and then retreat said lever out of the bending field, means for advancing the other lever to perform a similar operation for the other side of the link and then retreat said lever out of the bending field, and a curved guide or track to actuate said levers to effect such final bends, for the purpose set forth.

44. The combination, with link forming and wire feeding mechanism and an anvil or former, of a movable rear support normally in the rear of said anvil, means connected with the link forming mechanism for temporarily removing said support from the anvil, and means for automatically returning said support to its normal position, for the purpose set forth.

45. In a chain forming machine, the combination of a mandrel, means for feeding a blank into bending position with respect to the mandrel, and means for simultaneously rolling the end portions of the blank partly about the mandrel to first U up the blank and for then rolling first one and then the other end portion of the blank about the mandrel to complete the link formation.

46. In a chain forming machine, the combination of a mandrel, means for feeding a blank to position with relation to the mandrel, two levers for acting on the blank to bend it about the mandrel, and means for causing said levers to act simultaneously upon the end portions of the blank to partly carry said end portions about the mandrel and for then acting successively upon said end portions to complete the bending of the blank about the mandrel.

47. In a chain forming machine, the combination of a mandrel, means for feeding a blank to position with relation to the mandrel, two levers carrying rolls for acting on the blank to bend it about the mandrel, and means for causing said levers to act simultaneously upon the end portions of the blank to partly carry said end portions about the mandrel and for then acting successively upon said end portions to complete the bending of the blank about the mandrel.

48. In a machine for forming chain, a former, means for holding the blank against said former, a pair of forming rolls, means to cause said rolls to travel to first U up a blank about said former, and means operating thereafter to cause said rolls to press at different times each end of said blank against said former, and thereby cause said ends to abut and close the link.

49. In a machine for forming chain, a former, a pair of forming rolls, independent means for causing each roll to pursue a curved path about said former to bend one end of said blank about said former, and means for causing each roll to press one end of said blank against said former while the other roll is held out of its path.

Signed at Bridgeport in the county of Fairfield and State of Connecticut this 14th day of Sept. A. D. 1905.

JAMES COULTER.

Witnesses:
G. A. DOUGLAS,
GEORGE W. FINN.

---

Copies of this patent may be obtained for five cents each, by addressing the "Commissioner of Patents, Washington, D. C."